United States Patent
Suzuki et al.

(10) Patent No.: US 6,978,632 B2
(45) Date of Patent: Dec. 27, 2005

(54) AIR CONDITIONING SYSTEM FOR VEHICLES

(75) Inventors: Kenichi Suzuki, Isesaki (JP); Atsuo Inoue, Isesaki (JP); Tomonori Imai, Isesaki (JP); Hiromitsu Adachi, Wako (JP); Hideki Watanabe, Wako (JP); Shinichirou Wakou, Wako (JP)

(73) Assignees: Sanden Corporation, Gunma (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/797,665

(22) Filed: Mar. 11, 2004

(65) Prior Publication Data
US 2004/0221594 A1 Nov. 11, 2004

(30) Foreign Application Priority Data

Mar. 17, 2003 (JP) ............................. 2003-071983
Feb. 12, 2004 (JP) ............................. 2004-034939

(51) Int. Cl.⁷ .......................................... F25B 49/02
(52) U.S. Cl. ...................................... 62/228.5; 62/236
(58) Field of Search .......................... 62/228.1, 228.4, 62/228.5, 236

(56) References Cited

U.S. PATENT DOCUMENTS

| 4,591,318 A | 5/1986 | Elson |
| 4,990,071 A | 2/1991 | Sugimoto |
| 5,385,453 A | 1/1995 | Fogt et al. |
| 5,435,144 A | 7/1995 | Kalmbach |
| 5,755,564 A | 5/1998 | Machida et al. |
| 5,867,996 A | 2/1999 | Takano et al. |
| 5,983,656 A | 11/1999 | Tokumasu |
| 6,109,045 A | 8/2000 | Takenaka |
| 6,192,155 B1 | 2/2001 | Fan |
| 6,217,297 B1 | 4/2001 | Tsumagari et al. |
| 6,230,507 B1 | 5/2001 | Ban et al. |
| 6,234,769 B1 | 5/2001 | Sakai et al. |
| 6,247,899 B1 | 6/2001 | Ban et al. |
| 6,287,081 B1 | 9/2001 | Tamegai et al. |
| 6,334,755 B1 | 1/2002 | Coudray et al. |
| 6,375,436 B1 | 4/2002 | Irie et al. |
| 6,438,981 B1 * | 8/2002 | Whiteside .................. 62/228.1 |
| 6,443,712 B2 | 9/2002 | Sakai et al. |
| 6,487,869 B1 * | 12/2002 | Sulc et al. ..................... 62/230 |

(Continued)

FOREIGN PATENT DOCUMENTS

DE 19513710 10/1995

(Continued)

Primary Examiner—William E. Tapolcai
(74) Attorney, Agent, or Firm—Baker Botts L.L.P.

(57) ABSTRACT

An air conditioning system for a vehicle includes a hybrid compressor having a first compression mechanism driven by a drive source for driving the vehicle and a second compression mechanism driven by an electric motor, means for selecting a drive source, a means for detecting a refrigeration cycle condition, and means for estimating a power consumption of the compressor due to a selected drive source and a power consumption of the compressor due to a non-selected drive source in response to a value detected by the means for detecting a refrigeration cycle condition, when one drive source has been selected. Through this estimation, a preferred drive source may be selected in response to the condition of the refrigeration cycle or a thermal load.

9 Claims, 5 Drawing Sheets

U.S. PATENT DOCUMENTS

| | | |
|---|---|---|
| 6,543,243 B2 | 4/2003 | Mohrmann et al. |
| 6,742,350 B2 * | 6/2004 | Suzuki et al. ............... 62/230 |
| 6,755,041 B2 * | 6/2004 | Wessells et al. ............ 62/236 |
| 6,796,138 B1 * | 9/2004 | Imai et al. .................. 62/236 |
| 6,830,438 B2 * | 12/2004 | Iwanami et al. ............ 417/16 |
| 2001/0047659 A1 | 12/2001 | Nakamura et al. |
| 2001/0049943 A1 | 12/2001 | Nakamura et al. |
| 2003/0053916 A1 | 3/2003 | Terauchi |
| 2003/0136138 A1 | 7/2003 | Tsuboi et al. |
| 2003/0152467 A1 | 8/2003 | Higashiyama et al. |
| 2004/0000156 A1 | 1/2004 | Inoue et al. |
| 2004/0001760 A1 | 1/2004 | Yoshii et al. |
| 2004/0020229 A1 | 2/2004 | Adachi et al. |
| 2004/0211197 A1 | 10/2004 | Higashiyama et al. |

FOREIGN PATENT DOCUMENTS

| | | |
|---|---|---|
| EP | 1213166 | 6/2002 |
| EP | 1285791 A1 * | 2/2003 |
| JP | 687678 | 12/1984 |
| JP | 60153885 | 10/1985 |

* cited by examiner

AIR CONDITIONING SYSTEM FOR VEHICLES

BACKGROUND OF THE INVENTION

1. Field of the Invention

The present invention relates to an air conditioning system for vehicles comprising a hybrid compressor driven by a drive source for driving a vehicle (e.g., an engine) or an electric motor, or a combination thereof. In particular, the present invention relates to the control of an air conditioning system for vehicles, in which the drive sources of the hybrid compressor may be switched to more optimally use the drive sources in consideration of a power consumption by the hybrid compressor.

2. Description of Related Art

Hybrid compressors mounted in a vehicle as part of an air conditioning system for the vehicle and capable of being driven by an vehicle engine or an electric motor, or a combination thereof are known. Such known compressors are described in Japanese Patent Publication No. JP-A-10-291415. Further, a control system for a hybrid compressor is described in Japanese Patent Publication No. JP-A-63242, wherein when a drive source for the hybrid compressor is selected, the power required by alternative drive sources for driving the compressor is estimated for each drive source when driven individually, and the drive source having a lower estimated power requirement is selected.

SUMMARY OF THE INVENTION

Accordingly, a need has arisen for an air conditioning system for a vehicle comprising a hybrid compressor which comprises a first compression mechanism driven by a drive source for driving the vehicle and a second compression mechanism driven by an electric motor, which may better drive the compressor and select the drive source, in response to various conditions of the air conditioning system or the vehicle. In the present invention, attention is paid, such that a drive source for a hybrid compressor may be more appropriately selected depending on a thermal load by basing drive source selection on a detection of a thermal load on a refrigeration cycle. Moreover, a drive source for a hybrid compressor may be more appropriately selected depending on a refrigeration cycle condition by basing drive source selection on a detection of a refrigeration cycle condition caused by the driving of the compressor by the selected drive source. Further, it is an object to the present invention to provide an air conditioning system for vehicles, which may achieve improved or optimized control, particularly in connection with a power consumption of a hybrid compressor.

To achieve the foregoing and other objects, an air conditioning system for a vehicle according to the present invention comprises a hybrid compressor comprising a first compression mechanism driven by a drive source for driving the vehicle and a second compression mechanism driven by an electric motor; means for selecting a drive source for the compressor and for switching the drive source, as needed; means for detecting a condition of a refrigeration cycle when the compressor is driven; and means for estimating power consumption of the compressor due to a selected drive source in response to a value detected by the means for detecting a condition of the refrigeration cycle, when either the drive source for driving the vehicle or the electric motor is selected as the drive source for the compressor by the means for selecting a drive source. By this control system, it becomes possible to determine whether the present selection of the drive source for the compressor is improved or optimal with respect to the power consumption of the compressor.

In the air conditioning system according to the present invention, the hybrid compressor either may be a hybrid compressor in which a first compression mechanism and a second compression mechanism are formed separately from each other or may be a hybrid compressor in which a first compression mechanism and a second compression mechanism are formed integrally within the hybrid compressor.

Further, in the air conditioning system according to the present invention, it is preferred that when either the drive source for driving the vehicle or the electric motor is selected as the drive source for the compressor by the means for selecting a drive source, the power consumption of the compressor due to the selected drive source, which is estimated by the means for estimating power consumption, may be compared to a power consumption of the compressor due to a non-selected drive source, which is required for generating substantially the same level of a cooling ability as that due to the selected drive source.

Moreover, in the air conditioning system according to the present invention, it also is preferred that the air conditioning system comprises means for detecting a refrigeration cycle load to detect a thermal load of the refrigeration cycle, and when either the drive source for driving the vehicle or the electric motor is selected as the drive source for the compressor by the means for selecting a drive source, a power consumption of the compressor due to a non-selected drive source is estimated in response to a value detected by the means for detecting the refrigeration cycle load.

By such structures, it becomes possible to apply a standard for determining whether the drive source selected at the present time, advantageously may be switched to the other drive source. In particular, when either the drive source for driving the vehicle or the electric motor is selected as the drive source for the compressor by the means for selecting a drive source, the other drive source for the compressor may be selected (or switched) by the means for selecting a drive source, by comparing the estimated power consumption of the compressor due to the selected drive source and the estimated power consumption of the compressor due to the non-selected drive source. When switching, the drive source for the compressor consuming less power of the compressor may be selected by the means for selecting a drive source, by comparing the estimated power consumption of the compressor due to the selected drive source with the estimated power consumption of the compressor due to the non-selected drive source.

In addition, in the air conditioning system according to the present invention, the electric motor may not be selected as the drive source for the compressor when the drive source for driving the vehicle is selected as the drive source for the compressor by the means for selecting a drive source and when an estimated power consumption of the compressor due to the electric motor as the non-selected drive source is greater than a preset value. In particular, the selection of the electric motor when the drive source is switched may be restricted based on power requirements, in view of the above-described estimation and comparison of the consumption powers.

In still a further air conditioning system according to the present invention, the electric motor may be selected as the drive source for the compressor when the drive source for driving the vehicle is selected as the drive source for the compressor by the means for selecting a drive source, when a mean power consumption of the compressor per a preset unit time is calculated with respect to a value detected by the means for detecting a refrigeration cycle condition, and when the calculated mean power consumption is less than a preset value. In particular, the electric motor may be selected as the drive source at a time of a low refrigeration cycle load.

Moreover, the electric motor may not be selected as a sole drive source for the compressor when the drive source for driving the vehicle is selected as the drive source for the compressor by the means for selecting a drive source, when a mean power consumption of the compressor per a preset unit time is calculated with respect to a value detected by the means for detecting refrigeration cycle condition, and when the calculated mean power consumption is greater than or equal to a preset value. In particular, use of the electric motor as the drive source for the compressor may be prevented at a time of a high refrigeration cycle load.

The air conditioning system according to the present invention also may comprises an electromagnetic clutch for engaging and disengaging the drive source for driving the vehicle and the compressor. In such a structure, the electric motor may be selected as the drive source for the compressor, if after the drive source for driving the vehicle is selected as the drive source for the compressor by the means for selecting a drive source and a power consumption of the compressor in an excitation condition of the electromagnetic clutch is calculated, the calculated power consumption is greater than or equal to a preset value. In particular, this control mechanism is provided, so that the electric motor may be selected as the drive source for the compressor at a time of a high-speed driving.

Further, the means for detecting a refrigeration cycle condition in the air conditioning system according to the present invention may detect at least one of a pressure at a high-pressure side and at a low-pressure side of the refrigeration cycle, a rotational speed of an engine of the vehicle, an input current to the electric motor, an input current to an inverter for driving the electric motor, an availability factor of the compressor, and a signal for controlling a displacement of the compressor.

The refrigeration cycle load detecting means also or alternatively may detect at least one of an outside temperature, a temperature in a vehicle compartment, an amount of sunshine, an amount of air discharged by a blower, a target air temperature at an exit of an evaporator, and a vehicle driving speed.

In the system according to the present invention as described above, improved switching control and restriction of the drive source may be achieved by monitoring the power consumption of the hybrid compressor and values detected by the means for detecting a refrigeration cycle load or by the means for detecting a refrigeration cycle condition detecting means, in particular, by comparing the estimated power consumption due to the drive source selected at the present time and the power consumption due to the non-selected drive source.

Therefore, in air conditioning system according to the present invention, the thermal load to the refrigeration cycle is detected and a preferred drive source may be selected depending on the detected thermal load so as to achieve power savings. Further, by detecting a refrigeration cycle condition caused by the selected drive source, and because switching control may be achieved in accordance with variations of the rotational speed of an engine and the like, the power consumption of the compressor may be reduced further. Therefore, the compressor may be driven more efficiently in response to the thermal load of the refrigeration cycle and the driving condition of the vehicle. In particular, by selecting a preferred drive source, thereby achieving a preferred switching of the drive source for the compressor may be achieved.

Other objects, features, and advantages of the present invention will be apparent to persons of ordinary skill in the art from the following detailed description of preferred embodiments of the present invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

DETAILED DESCRIPTION OF PREFERRED EMBODIMENTS

Figure 1:
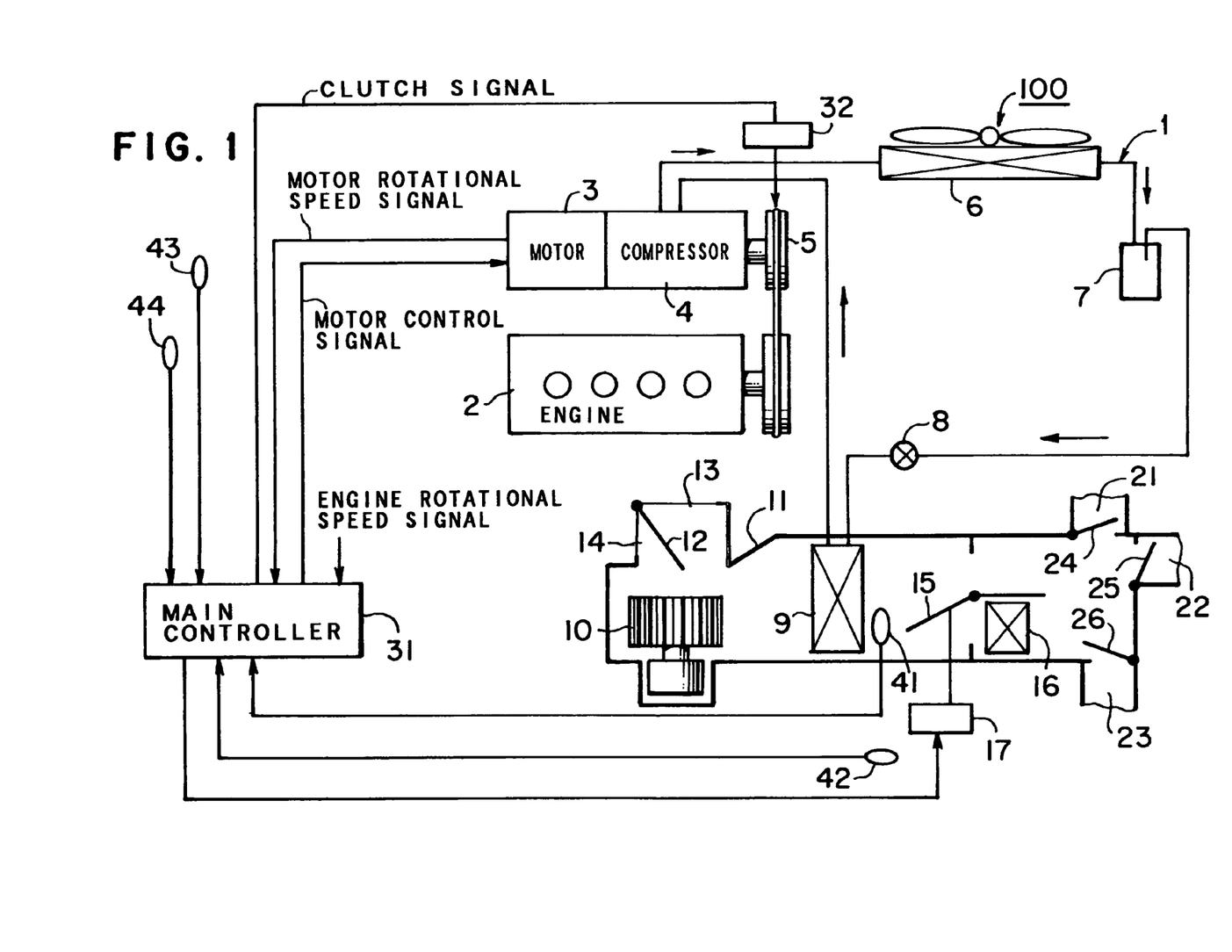
FIG. 1 is a schematic diagram of an air conditioning system for a vehicle according to an embodiment of the present invention.

FIG. 1 depicts an air conditioning system for a vehicle according to an embodiment of the present invention. In FIG. 1, air conditioning system 100 comprises hybrid compressor 4 having a first compression mechanism driven by engine 2, which is provided as a drive source for driving a vehicle, and a second compression mechanism driven by electric motor 3. In this embodiment, the first and second compression mechanisms are formed integrally within hybrid compressor 4, and electric motor 3 is contained within the compressor 4. The driving force from engine 2 is transmitted to compressor 4 via electromagnetic clutch 5. A high-temperature and high-pressure refrigerant compressed by hybrid compressor 4 having these two drive sources is cooled at condenser 6 by exchanging heat with outside air, and the refrigerant is condensed and liquefied. The refrigerant is separated into a gaseous-phase portion and a liquid-phase portion by receiver 7, and the liquid refrigerant is reduced in pressure by expansion valve 8. The pressure-reduced, liquid refrigerant flows into evaporator 9 provided as a cooler, and exchanges heat with air delivered by blower 10. The refrigerant evaporated in evaporator 9 is drawn into hybrid compressor 4, and again compressed.

Air conditioning system 100 also may comprise air duct 11 through which air for air conditioning of a vehicle interior passes. Outside air introduction port 13 and inside air introduction port 14 are provided at the entrance of air duct 11, and switching damper 12 switches the rate of the amount of air drawn from both ports 13 and 14. In air duct 11, blower 10, evaporator 9, air mixing damper 15, and heater core 16 which is provided as a heater, are disposed in this order. The degree to which air mixing damper 15 is opened is adjusted by air mixing damper actuator 17, and by this adjustment, the amount of air having passed through evaporator 9 and through heater core 16 may be adjusted in comparison to the amount of air having passed through evaporator 9 and bypassed heater core 16. Air conditioning system 100 also may comprise respective air discharge ports 21, 22, and 23 at downstream positions of air duct 11, such as air discharge ports for a DEFROST mode, a VENT mode, and a FOOT mode. These air discharge ports 21, 22, and 23 may be selected, and their opening and closing may be controlled by respective dampers 24, 25, and 26.

Air conditioning system 100 also may comprise a main controller 31. A clutch control signal for controlling electromagnetic clutch 5 is sent from main controller 31 to clutch controller 32 connected to electromagnetic clutch 5. A motor control signal for controlling electric motor 3 is sent from main controller 31 to a motor driver (not shown) incorporated into electric motor 3. An opening degree signal for controlling the opening degree of air mixing damper 15 is sent from main controller 31 to air mixing damper actuator 17. A motor rotational speed signal from electric motor 3 and an engine rotational speed signal (Ne) from engine 2 are input, respectively, to main controller 31.

Sensors for the control for air conditioning are provided in air conditioning system 100. A temperature sensor 41 for measuring a temperature (Teva) of air dispensed from evaporator 9 may be positioned between evaporator 9 and heater core 16, and temperature sensor 41 may be connected operationally to main controller 31. Main controller 31 also may receive a signal from a temperature sensor 42 for detecting a vehicle interior temperature (Tin), a signal from a temperature sensor 43 for detecting an outside air temperature (Tamb), and a signal from a sunshine sensor 44 for detecting an amount of sunshine (Rsun), respectively. In this embodiment, in addition to the foregoing signals, a signal of motor power consumption (Wm), a signal of a pressure of a high-pressure side of the refrigeration cycle (Pd), a signal of vehicle driving speed (VS), and a signal of a target, evaporator exit side air temperature (Tof) (hereinafter "target evaporation temperature"), may be input to main controller 31, respectively.

Figure 2:
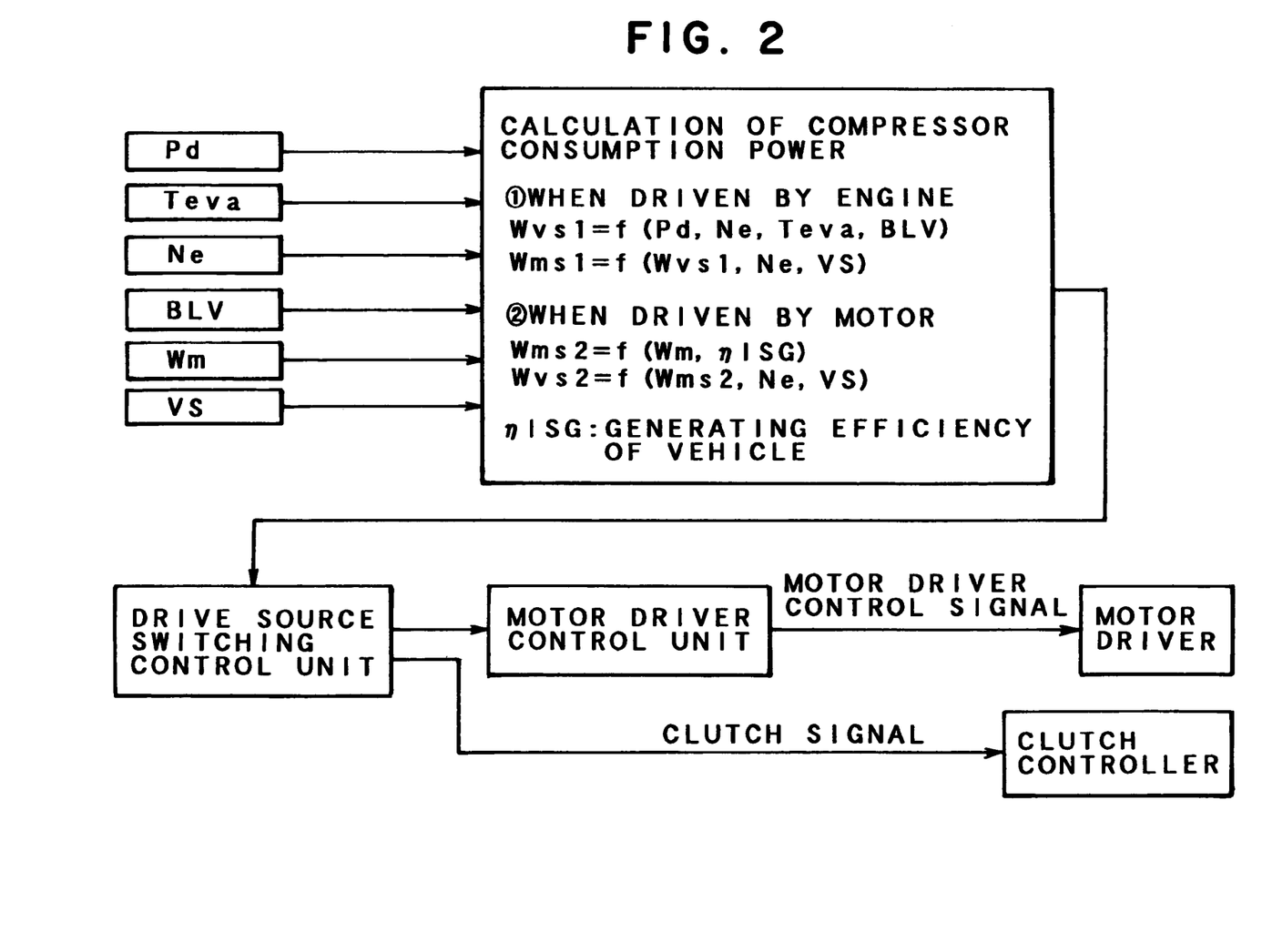
FIG. 2 is a block diagram depicting an example of the operation of the air conditioning system of FIG. 1.
Figure 3:
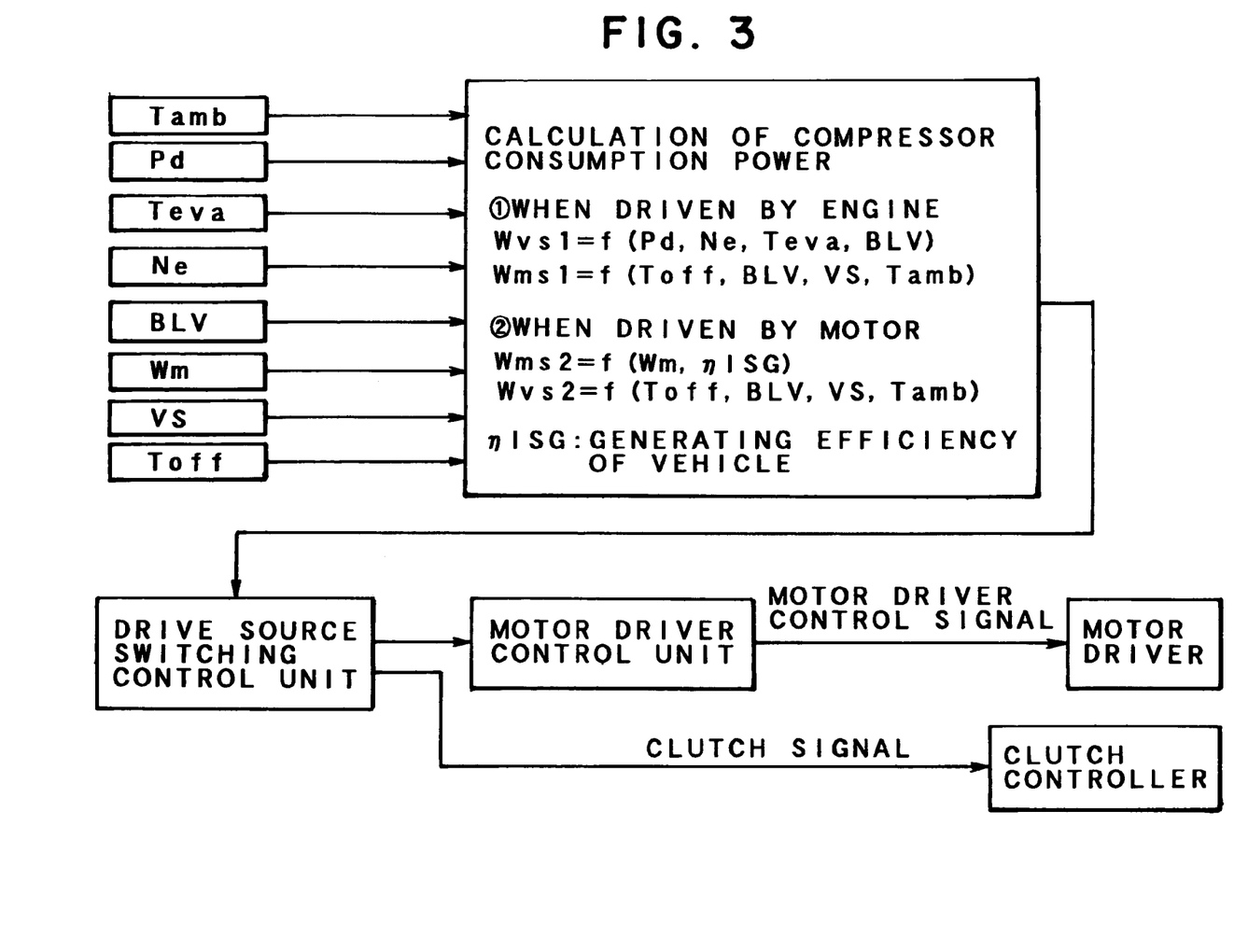
FIG. 3 is a block diagram depicting another example of the operation of the air conditioning system of FIG. 1.

In such an air conditioning system 100 for a vehicle, the following information may be gathered as information required for control of switching of drive sources for hybrid compressor 4 or for calculation of a power consumption of hybrid compressor 4, for example, as shown in FIGS. 2 and 3. In particular, information detected by means for detecting a refrigeration cycle load may include at least one of the following:

Outside air temperature (Tam);
Vehicle interior temperature (Tin);
Amount of sunshine (Rsun);
Blower voltage as an amount of air by the blower (BLV);
Vehicle running speed (VS);
Target evaporator exit side air temperature (Toff).
Information detected by means for detecting a refrigeration cycle condition may include at least one of the following:
Refrigerant pressure at a low-pressure side (measured at a suction side) (Ps);
Refrigerant pressure at a high-pressure side (measured at a discharge side) (Pd);
Refrigerant temperature at a high-pressure side (measured at a discharge side) (Td);
Refrigerant temperature at a low-pressure side (measured at a suction side) (Ts);
Flow rate of refrigerant (Flow);
Availability factor of compressor (CL);
Input current of electric motor (Im);
Input voltage of inverter (i.e., drive device of electric motor) (Vm); and
Engine rotational speed (Ne).

The following are examples of methods for estimating a power consumption of a compressor referring to a value detected by means for detecting a refrigeration cycle condition.

Step 1: A high-pressure side refrigerant pressure (Pd) and an engine rotational speed (Ne) are detected.

A compressor torque (Trq) is calculated:

$$Trq = f(Pd)$$

A compressor power (W) is calculated:

$$W = f(Trq, Ne)$$

Step 2: A high-pressure side refrigerant pressure (Pd), a low-pressure side refrigerant pressure (Ps), and an engine rotational speed (Ne) are detected.

A compressor torque (Trq) is calculated.

$$Trq = f(Pd, Ps)$$

A compressor power (W) is calculated.

$$W = f(Trq, Ne)$$

Step 3: A high-pressure side refrigerant pressure (Pd), a low-pressure side refrigerant pressure (Ps), a high-pressure side refrigerant temperature (Td), a low-pressure side refrigerant temperature (Ts), and a refrigerant flow rate (Flow) are detected.

An enthalpic difference (H) between an entrance and an exit of a compressor is calculated.

$$H = f(Pd, Ps, Td, Ts)$$

A compressor power (W) is calculated.

$$W = f(H, Flow)$$

Step 4: An availability factor of compressor (CL) is detected. A compressor power (Won) under conditions in which the compressor is working (e.g., a clutch is in an ON condition) is calculated by anyone of the above-described Steps 1–3.

A mean power (W) during clutch cycling is calculated.

$$W = W_{on} * CL$$

Step 5: An electric motor input current (Im) and an inverter input voltage (Vm) are detected, and an power consumption (P) when driven by an electric motor is calculated.

$$P = Im * Vm$$

A compressor power (W) is calculated.

$$W = f(P, \eta ISG)$$

Where ηISG is a power generating efficiency of a vehicle.

The following are examples of methods for calculating (or estimating) power consumption of a compressor being driven by a drive source selected at the present time and a power consumption of a compressor to be driven by a non-selected drive source. Examples of methods for switching drive sources also are provided. Methods for calculating a power consumption of a compressor when driven by an engine are as follows:

As depicted in FIG. 2, a high-pressure side refrigerant pressure (Pd), an engine rotational speed (Ne), an evaporator exit side air temperature (Teva), and a blower voltage (BLV)

may be detected, and power consumption of a compressor when driven by an engine (Wvs1) may be calculated by the following equation:

$$Wvs1 = f(Pd, Ne, Teva, BLV) \text{ (power of an operational drive source)}$$

Power consumption of a compressor (Wms1) due to an electric motor as a non-selected drive source, which is required for generating substantially the same level of a cooling ability as that due to the engine as a selected drive source, is calculated (or estimated) by the following equation, using an engine rotational speed (Ne), a vehicle running speed (VS), and the above-calculated compressor power consumption (Wvs1) when driven by the engine:

$$Wms1 = f(Wvs1, Ne, VS) \text{ (power of a non-operational drive source)}$$

The calculated power consumption values then may be compared, and the drive source having the smaller power consumption value is selected. With respect to the calculation of power consumption when the compressor is driven by an electric motor, power consumption (Win) of an electric motor and a power generating efficiency of a vehicle (ηISG) are detected. Power consumption of a compressor when driven by an electric motor (Wms2) then may be calculated by the following equation:

$$Wms2 = f(Win, \eta ISG) \text{ (power of an operational side)}$$

Power consumption of a compressor (Wvs2) due to an engine as a non-selected drive source which is required to generate substantially the same level of a cooling ability as that provided with the electric motor as a selected drive source is calculated (or estimated) by the following equation, using an engine rotational speed (Ne), a vehicle running speed (VS), and the above-calculated compressor power consumption (Wms2) when driven by the electric motor:

$$Wvs2 = f(Wms2, Ne, VS) \text{ (power of a non-operational drive source)}$$

The calculated power consumption values may be compared, and a drive source having a smaller power consumption value may be selected.

In a situation in which power consumption of a compressor when driven by a non-selected drive source is estimated from a thermal load, for example, as depicted in FIG. 3, power consumption of a compressor (Wms1) to be driven by an electric motor when currently driven by an engine is estimated by the following equation, as a function of a target evaporation temperature (Toff), a blower voltage (BLV), a vehicle speed (VS), and an outside air temperature (Tamb):

$$Wms1 = f(Toff, BLV, VS, Tamb)$$

Power consumption of a compressor (Wvs2) to be driven by an engine when currently driven by an electric motor is estimated by the following equation, similarly as a function of a target evaporation temperature (Toff), a blower voltage (BLV), a vehicle speed (VS), and an outside air temperature (Tamb):

$$Wvs2 = f(Toff, BLV, VS, Tamb)$$

Figure 4:
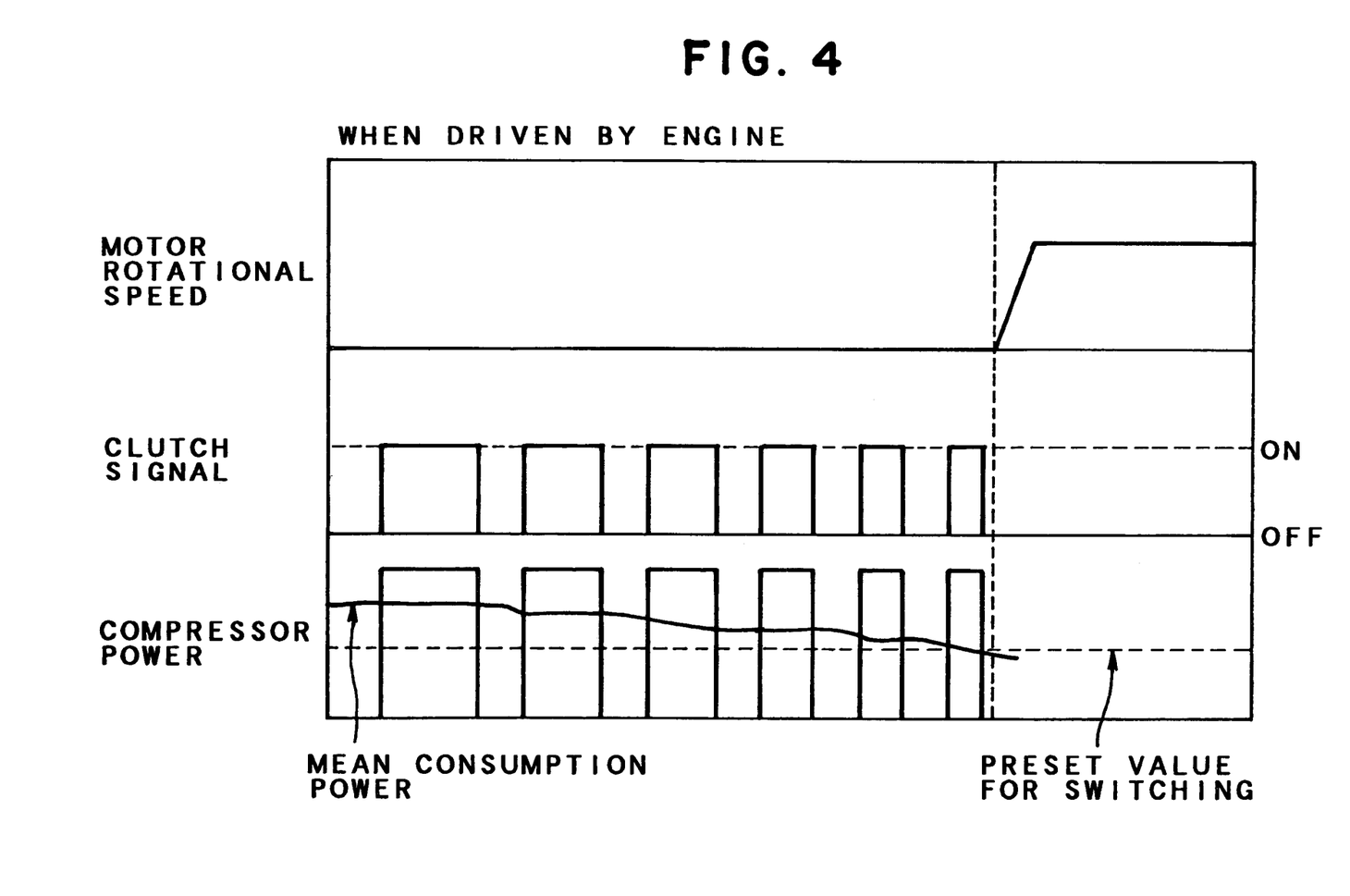
FIG. 4 is a graph depicting an example of a drive source switching control of the air conditioning system of FIG. 1.

Control of the selection of a drive source may be carried out, for example, along the following steps. A drive source may be selected by a value detected by a refrigeration cycle load detecting means. Next, a compressor may be driven by the selected drive source. The power consumption due to the drive source selected may be calculated, and a drive source may be selected or switched. As depicted in FIG. 4, if the compressor is being driven initially by the engine, when a mean value of a compressor power consumption falls below a preset value (e.g., a preset value for switching a drive source), the drive source is switched to an electric motor. In particular, the drive source may be switched to an electric motor at a time of a low refrigeration cycle load. When, however, the mean value of the power consumption is greater than the preset value, the engine continues as the drive source for the compressor. In particular, an electric motor may be prohibited from becoming the drive source at a time of a high refrigeration cycle load.

Figure 5:
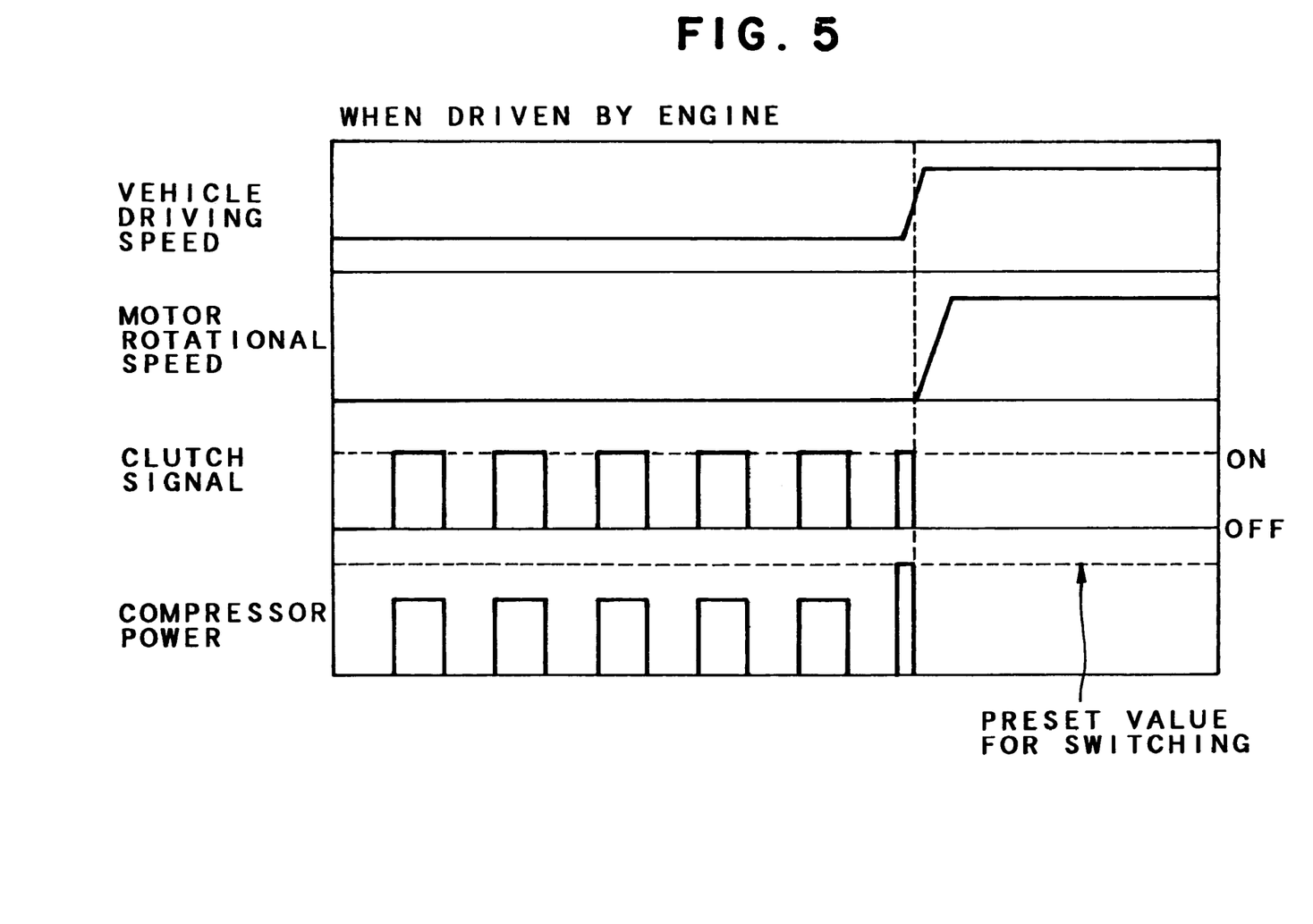
FIG. 5 is a graph depicting another example of a drive source switching control of the air conditioning system of FIG. 1.

Further, as depicted in FIG. 5, when a compressor power consumption at a time when a clutch is turned ON reaches or exceeds a preset value, the drive source may be switched to an electric motor. In particular, the drive source may be switched to an electric motor at a time of a high driving speed. Compressor power consumption may be calculated by the a method described above, and a drive source having a lower consumption power may be selected.

For example, when driving the vehicle, if power consumption of an electric motor is greater than or equal to a power restriction value, the drive source is switched from the electric motor to the engine. Alternatively, when driving the vehicle, if an evaporator exit side air temperature does not reach the target evaporation temperature (Toff), the drive source is switched from the electric motor to the engine. Compressor power consumption may be calculated by a method described above, and a drive source having a lower power consumption may be selected. Thus, when the vehicle is in an idling stop condition, the compressor may be driven by an electric motor. Therefore, in the present invention, selection of a drive source and switching of a drive source based on the estimation of a compressor power consumption, may be available in various situations.

Although the above-described embodiment has been explained as an air conditioning system for a vehicle having a hybrid compressor in which a first compression mechanism driven by a drive source for driving a vehicle and a second compression mechanism driven by an electric motor are integrally formed within the compressor, the present invention may be applied similarly to an air conditioning system for a vehicle having a hybrid compressor in which a first compression mechanism and a second compression mechanism are provided separately from each other.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. An air conditioning system for a vehicle comprising:
   a hybrid compressor comprising a first compression mechanism driven by a drive source for driving said vehicle and a second compression mechanism driven by an electric motor;
   means for selecting a drive source for said compressor and switching the drive source;
   means for detecting a condition of a refrigeration cycle when said compressor is driven; and means for estimating a power consumption of said compressor due to a selected drive source in response to a value detected by said means for detecting a condition of the refrigeration cycle, when either said drive source for driving said vehicle or said electric motor is selected as said drive source for said compressor by said means for selecting a drive source, wherein, in response to said power consumption of said compressor due to said selected drive source, which consumption power is estimated by said means for estimating a power consumption, a power consumption of said compressor due to a non-selected drive source for generating substantially the same level of a cooling ability as that due to said selected drive source is estimated.

2. The air conditioning system of claim 1, wherein said first compression mechanism and said second compression mechanism are formed integrally within said hybrid compressor.

3. The air conditioning system of claim 1, wherein said drive source for said compressor is selected by said means for selecting a drive source, by comparing to said estimated power consumption of said compressor due to said selected drive source and said estimated power consumption of said compressor due to said non-selected drive source.

4. The air conditioning system of claim 3, wherein said drive source for said compressor consuming less power is selected by said means for selecting a drive source, by comparing said estimated power consumption of said compressor due to said selected drive source with said estimated power consumption of said compressor due to said non-selected drive source.

5. The air conditioning system of claim 3, wherein said electric motor is not selected as said drive source for said compressor when said drive source for driving said vehicle is selected as said drive source for said compressor by said means for selecting a drive source and when an estimated power consumption of said compressor due to said electric motor as said non-selected drive source is greater than a preset value.

6. The air conditioning system of claim 1, wherein said electric motor is selected as said drive source for said compressor when said drive source for driving said vehicle is selected as said drive source for said compressor by said means for selecting a drive source, a power consumption of said compressor per a preset unit time is calculated with respect to a value detected by said means for detecting a refrigeration cycle condition, and when said calculated mean power consumption is less than a preset value.

7. The air conditioning system of claim 1, wherein said electric motor is not selected as a sole drive source for said compressor when said drive source for driving said vehicle is selected as said drive source for said compressor by said means for selecting a drive source, a mean power consumption of said compressor per a preset unit time is calculated with respect to a value detected by said means for detecting a refrigeration duty cycle condition, and when said calculated mean power consumption is greater than or equal to a preset value.

8. The air conditioning system of claim 1 further comprising an electromagnetic clutch for engaging and disengaging said drive source for driving said vehicle and said compressor, wherein said electric motor is not selected as said drive source for said compressor when said drive source for driving said vehicle is selected as said drive source for said compressor by said means for selecting a drive source, a calculated power consumption of said compressor in an excitation condition of said electromagnetic is greater than or equal to a preset value.

9. The air conditioning system of claim 1, wherein said means for detecting a refrigeration cycle condition detects at least one of a pressure at a high-pressure side and at a low-pressure side of said refrigeration cycle, a rotational speed of an engine of said vehicle, an input current to said electric motor, an input current to an inverter for driving said electric motor, an availability factor of said compressor, and a signal for controlling a displacement of said compressor.

* * * * *